(12) United States Patent
Helms, III et al.

(10) Patent No.: US 11,880,002 B1
(45) Date of Patent: Jan. 23, 2024

(54) MANUALLY ROTATABLE SONAR TRANSDUCER MOUNTING APPARATUS

(71) Applicant: Sniper Marine, LLC, Maryville, TN (US)

(72) Inventors: Charlie M. Helms, III, Vonore, TN (US); Timothy D. Tipton, Maryville, TN (US)

(73) Assignee: Sniper Marine, LLC, Maryville, TN (US)

( * ) Notice: Subject to any disclaimer, the term of this patent is extended or adjusted under 35 U.S.C. 154(b) by 85 days.

(21) Appl. No.: 17/373,855

(22) Filed: Jul. 13, 2021

Related U.S. Application Data

(60) Provisional application No. 63/136,683, filed on Jan. 13, 2021, provisional application No. 63/051,530, filed on Jul. 14, 2020.

(51) Int. Cl.
  *G01S 7/521* (2006.01)
  *G01S 15/96* (2006.01)

(52) U.S. Cl.
  CPC .............. *G01S 7/521* (2013.01); *G01S 15/96* (2013.01)

(58) Field of Classification Search
  CPC ...................................................... G01S 15/96
  See application file for complete search history.

(56) References Cited

U.S. PATENT DOCUMENTS

| | | | |
|---|---|---|---|
| 2,877,733 A * | 3/1959 | Harris | B63H 20/007 440/58 |
| 4,285,485 A | 8/1981 | Burke | |
| 4,735,166 A * | 4/1988 | Dimalanta | B63H 20/007 74/494 |
| 4,815,048 A * | 3/1989 | Boucher | G10K 11/355 367/173 |
| 4,982,924 A | 1/1991 | Havins | |
| 5,084,996 A | 2/1992 | Woodruff et al. | |
| 5,112,256 A * | 5/1992 | Clement | B63C 9/0011 440/58 |
| 5,182,732 A | 1/1993 | Pichowkin | |
| 5,525,081 A | 6/1996 | Mardesich et al. | |
| 5,675,552 A | 10/1997 | Hicks et al. | |
| 6,149,286 A | 11/2000 | Wiggins | |
| 6,254,441 B1 | 7/2001 | Knight et al. | |
| 6,694,665 B1 | 2/2004 | Moran | |
| 7,230,882 B2 | 6/2007 | Swisher | |
| 8,595,972 B2 | 12/2013 | Foss | |
| 9,322,915 B2 | 4/2016 | Betts et al. | |
| 10,107,908 B2 | 10/2018 | Betts et al. | |
| 10,377,459 B2 | 8/2019 | Burton et al. | |

(Continued)

FOREIGN PATENT DOCUMENTS

| | | |
|---|---|---|
| BG | 2397004 | 7/2004 |
| CA | 1288158 C | 8/1991 |

(Continued)

*Primary Examiner* — Isam A Alsomiri
*Assistant Examiner* — Joseph C Fritchman
(74) *Attorney, Agent, or Firm* — Robinson IP Law, PLLC

(57) ABSTRACT

A manually rotatable sonar transducer mounting apparatus for mounting a sonar transducer to a boat and providing a means to mechanically rotate a submerged sonar transducer with little mechanical effort or movement and with very little sound. A method for rotating a submerged sonar transducer using the manually rotatable sonar transducer mounting apparatus.

9 Claims, 12 Drawing Sheets

(56) References Cited

U.S. PATENT DOCUMENTS

| | | | |
|---|---|---|---|
| 10,743,474 B1* | 8/2020 | Schlimgen | B65G 33/14 |
| 2006/0288629 A1 | 12/2006 | Parker et al. | |
| 2009/0241405 A1 | 10/2009 | Foss | |
| 2013/0044569 A1 | 2/2013 | DePasqua | |
| 2013/0215719 A1 | 8/2013 | Betts et al. | |
| 2016/0007582 A1 | 1/2016 | Brancaleoni | |
| 2016/0091779 A1* | 3/2016 | Jodoin | G03B 17/563 |
| | | | 396/428 |
| 2016/0377716 A1 | 12/2016 | Proctor et al. | |
| 2019/0000049 A1 | 1/2019 | Bonutti et al. | |
| 2021/0310590 A1* | 10/2021 | Yogev | F16L 33/30 |

FOREIGN PATENT DOCUMENTS

| | | |
|---|---|---|
| CA | 2359223 A1 | 4/2002 |
| CA | 2359223 C | 3/2006 |
| CN | 205844528 | 12/2016 |
| CN | 111060915 | 4/2020 |

* cited by examiner

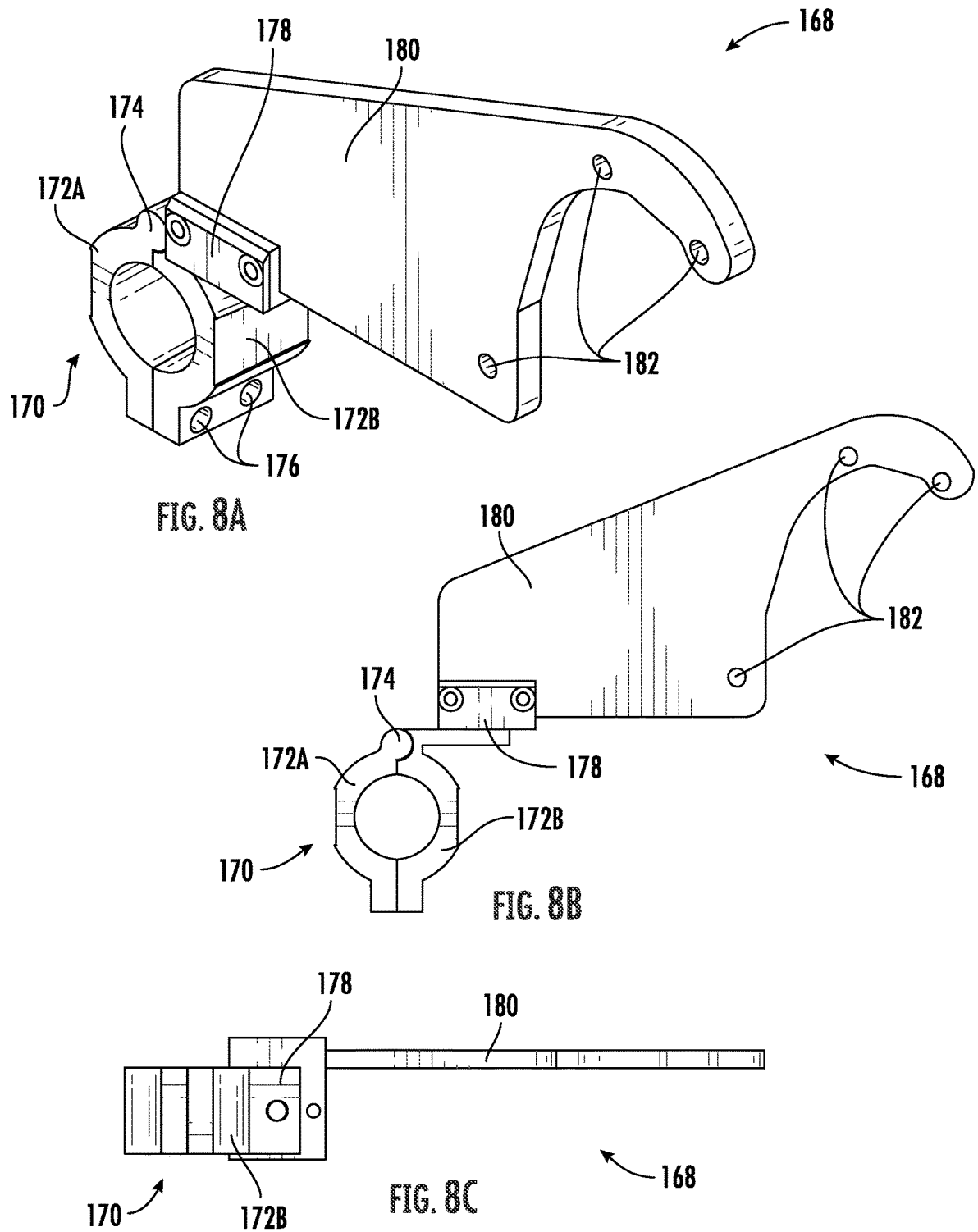

MANUALLY ROTATABLE SONAR TRANSDUCER MOUNTING APPARATUS

CROSS-REFERENCE(S) TO RELATED APPLICATION(S)

This application is a nonprovisional of and claims priority to (1) provisional U.S. Patent Application No. 63/051,530 entitled "MANUALLY ROTATABLE TRANSDUCER MOUNTING APPARATUS" filed on Jul. 14, 2020, and (2) provisional U.S. Patent Application No. 63/136,683 entitled "SONAR TRANSDUCER DIRECTION INDICATOR USING ONE OR MORE LIGHT BEAMS" filed on Jan. 13, 2021, the entireties of which are both incorporated herein by reference.

FIELD

This disclosure relates to the field of underwater sonar technology. More particularly, this disclosure relates to a manually rotatable transducer pole mount for attachment to the side of a boat and for obtaining sonar views of underwater objects.

BACKGROUND

Submersible transducers have been used for many years to detect the presence of fish or other underwater objects near a boat. Fisherman use transducers to detect fish or schools of fish to better determine where to cast fishing lines or nets. One example of a transducer system used for fishing include U.S. Pat. No. 10,107,908 entitled "360 Degree Imaging Sonar and Method" ("the '908 patent"). Embodiments described in the '908 patent include a motor having a rotatable shaft for turning the transducer to obtain views in all lateral directions. U.S. Pat. No. 5,525,081 entitled "Transducer System for Trolling Motor" describes a transducer that is attached to a trolling motor which is moved using a rotation motor powered by a battery and a foot pedal for actuating the rotation motor for rotating the trolling motor to different directions, thereby pointing the attached transducer in different directions. One important disadvantage of transducer systems that use motors for moving the transducers is that such motors generate sound when activated. Such generated sound can alarm surrounding fish, causing them to move away and out of range of a fishing boat.

One example of a rotatable transducer pole that does not necessarily use a battery-powered motor to rotate a transducer is described in U.S. Pat. No. 4,982,924 entitled "Mounting Apparatus for Sonar Transducer" ("the '924 patent"). However, the device described in the '924 patent includes a handle extending out and perpendicular from the top of a rotatable pole that includes a transducer attached at the bottom of the pole. In order to rotate the pole, it is necessary to move the handle such that, in certain positions, the handle extends out away from a boat and is harder to reach. A person using the device must move and reach beyond the pole to move the handle around a 360-degree turn. In addition to being physically difficult, such movement can also alarm surrounding fish, causing them to move away from and out of range of a fishing boat.

What is needed, therefore, is an apparatus configured to rotate a pole-mounted transducer submerged underwater without using a battery-powered motor and without requiring a person using the apparatus to make significant visible bodily movements to rotate the pole-mounted transducer.

SUMMARY

The above and other needs are met by a manually rotatable sonar transducer mounting apparatus comprising (1) a first rotatable member comprising: (1)(a) a top shaft comprising (1)(a)(i) a top shaft first end and (1)(a)(ii) a top shaft second end; and (1)(b) a first gear piece connected to the top shaft distal to the top shaft first end; (2) a second rotatable member comprising (2)(a) a bottom shaft comprising (2)(a)(i) a bottom shaft first end, (2)(a)(ii) a bottom shaft second end, and (2)(a)(iii) a transducer mounting point aperture located proximate to the bottom shaft first end; (2)(b) a second gear piece connected to the bottom shaft proximate to the bottom shaft second end, wherein the bottom shaft is hollow at least partially through the bottom shaft; and (3) a gear enclosure comprising (3)(a) a first wall; (3)(b) a top shaft sleeve attached to the first wall, wherein the top shaft extends through the first wall and the top shaft sleeve with the first gear piece located inside the gear enclosure; (3)(c) a second wall oriented orthogonal to the first wall; and (3)(d) bottom shaft sleeve including a bottom shaft sleeve first end and a bottom shaft sleeve second end, the bottom shaft sleeve attached to the second wall, wherein the bottom shaft extends through the second wall and the bottom shaft sleeve with the second gear piece located inside the gear enclosure mechanically engaged with the first gear piece. The manually rotatable sonar transducer mounting apparatus preferably further comprises (4) a handle connected to the top shaft first end.

In a preferred embodiment, the top shaft further comprises (1)(a)(iii) a handle shaft extending from the top shaft first end to a center shaft; and (1)(a)(iv) the center shaft comprising a center shaft first end and a center shaft second end, the center shaft connected to the handle shaft and configured such that the center shaft rotates when the handle shaft rotates.

In a preferred embodiment, the first rotatable member further comprises (1)(c) a third gear piece connected to the center shaft proximate to the center shaft second end, and wherein the center shaft second end extends to an indentation in a third wall of the gear enclosure.

In a preferred embodiment, the manually rotatable sonar transducer mounting apparatus further comprises (5) a third rotatable member further comprising (5)(a) a fourth gear piece mechanically engaged with the third gear piece; (5)(b) a direction indicator shaft connected to the fourth gear piece and configured such that the direction indicator shaft rotates when the fourth gear piece rotates, and wherein the direction indicator shaft extends through a fourth wall of the gear enclosure; and (5)(c) a direction indicator cap located outside the gear enclosure and connected to the direction indicator shaft configured such that the direction indicator cap rotates when the direction indicator shaft rotates.

The manually rotatable sonar transducer mounting apparatus preferably further comprises (6) a mounting sleeve surrounding a partial lengthwise section of the bottom shaft wherein the bottom shaft is free to rotate inside of and relative to the mounting sleeve; and wherein the second rotatable member further comprises a (2)(c) blocking collar attached to the bottom shaft above the transducer mounting point aperture and below the mounting sleeve to hold the mounting sleeve on the bottom shaft.

The manually rotatable sonar transducer mounting apparatus preferably further comprises (7) a tension collar configured to slide along the mounting sleeve and to at least partially overlap the bottom sleeve first end when the tension collar is in an engaged position, the tension collar comprising (7)(a) a plurality of interior O-rings wherein a first O-ring remains in contact with the mounting sleeve at all times and a second O-ring contacts the bottom shaft sleeve when the tension collar is in the engaged position, thereby creating tension between the mounting sleeve and the bottom shaft sleeve.

In another aspect a method for operating a manually rotatable sonar transducer mounting apparatus without the use of a motor is disclosed, the method comprising: attaching a sonar transducer to a bottom shaft of a second rotatable member of a manually rotatable sonar transducer mounting apparatus to form an assembled sonar transducer control apparatus; attaching the assembled sonar transducer control apparatus to a boat using a mounting assembly; submerging the sonar transducer underwater; rotating a first rotatable member which is mechanically engaged with and connected to the second rotatable member, thereby rotating the attached sonar transducer. The rotating step preferably further comprises rotating the first rotatable member which is mechanically engaged with and connected to a third rotatable member, the third rotatable member including a direction indicator cap, wherein rotation of the first rotatable member causes rotation of the direction indicator cap, and wherein the direction indicator cap is oriented to face in the same direction as the sonar transducer at all times.

The summary provided herein is intended to provide examples of particular disclosed embodiments and is not intended to cover all potential embodiments or combinations of embodiments. Therefore, this summary is not intended to limit the scope of the invention disclosure in any way, a function which is reserved for the appended claims.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

FIG. 8A shows a perspective view of a mount assembly for mounting the manually rotatable sonar transducer mounting apparatus shown in FIGS. 1-7 to a boat;

FIG. 8B shows a plan view of the mount assembly shown in FIG. 8A;

FIG. 8C shows a side view of the mount assembly shown in FIG. 8A and FIG. 8B;

Figure 1:
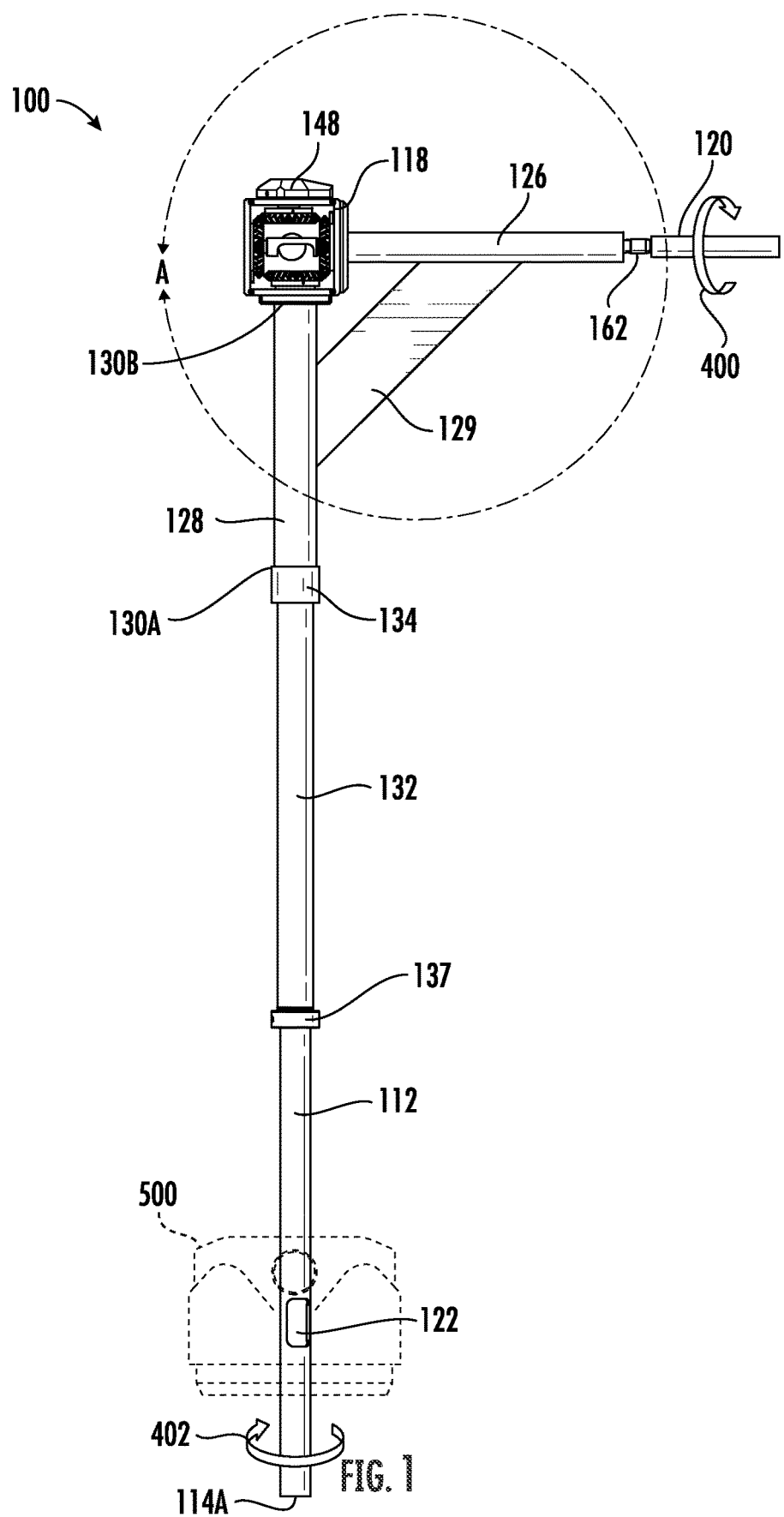
FIG. 1 shows a side view of an embodiment of a manually rotatable sonar transducer mounting apparatus for use with a submersible transducer wherein an example transducer is shown in phantom lines.

The figures are provided to illustrate concepts of the invention disclosure and are not intended to embody all potential embodiments of the invention. Therefore, the figures are not intended to limit the scope of the invention disclosure in any way, a function which is reserved for the appended claims.

DETAILED DESCRIPTION

Various terms used herein are intended to have particular meanings. Some of these terms are defined or otherwise described below for the purpose of clarity. The definitions/descriptions given below are meant to cover all forms of the words being defined (e.g., singular, plural, present tense, past tense). If the definition of any term below diverges from the commonly understood and/or dictionary definition of such term, the definitions below control.

FIGS. 1-7 show an embodiment of a manually rotatable sonar transducer mounting apparatus 100 for use with a submersible transducer 500. The manually rotatable sonar transducer mounting apparatus 100 includes a first rotatable member 102 and a second rotatable member 104. The second rotatable member 104 is at least partially hollow. The first rotatable member 102 includes a top shaft 108 including a top shaft first end 110A and a top shaft second end 110B. The second rotatable member 104 includes a bottom shaft 112 including a bottom shaft first end 114A and a bottom shaft second end 114B. The first rotatable member 102 further includes a first gear piece 116A connected to the top shaft 108 distal to the top shaft first end 110A. The second rotatable member 104 further includes a second gear piece 116B connected to the bottom shaft at or proximate to the bottom shaft second end 114B. The first gear piece 116A and the second gear piece 116B are preferably bevel gears although other gear types are contemplated such as, for example, cage and peg gears or other gear types known to persons having ordinary skill in the art. The first gear piece 116A is mechanically engaged with the second gear piece 116B inside a gear enclosure 118 so that when the first rotatable member 102 rotates, the second rotatable member 104 is caused to rotate. The first rotatable member 102 preferably further includes a handle 120 (shown in FIGS. 1-4 and FIG. 7A) attached to the top shaft first end 110A for a person to manually grip to rotate the first rotatable member 102, thereby causing the second rotatable member 104 to rotate.

The gear enclosure 118 includes a first wall 124A and a top shaft sleeve 126 attached to and extending out from the first wall 124A. The gear enclosure 118 also includes a second wall 124B situated orthogonal to the first wall 124A and a bottom shaft sleeve 128 attached to and extending out from the second wall 124B. The top shaft 108 extends from the top shaft second end 110B through a first wall aperture 125A in the first wall 124A and through the top shaft sleeve 126. The bottom shaft 112 extends from the bottom shaft second end 114B through a second wall aperture 125B in the second wall 124B and through the bottom shaft sleeve 128. A gusset 129 preferably is preferably included attached to the top shaft sleeve 126 and the bottom shaft sleeve 128. The bottom shaft sleeve 128 preferably includes a bottom shaft sleeve first end 130A and a bottom shaft sleeve second end 130B.

Figure 6A:
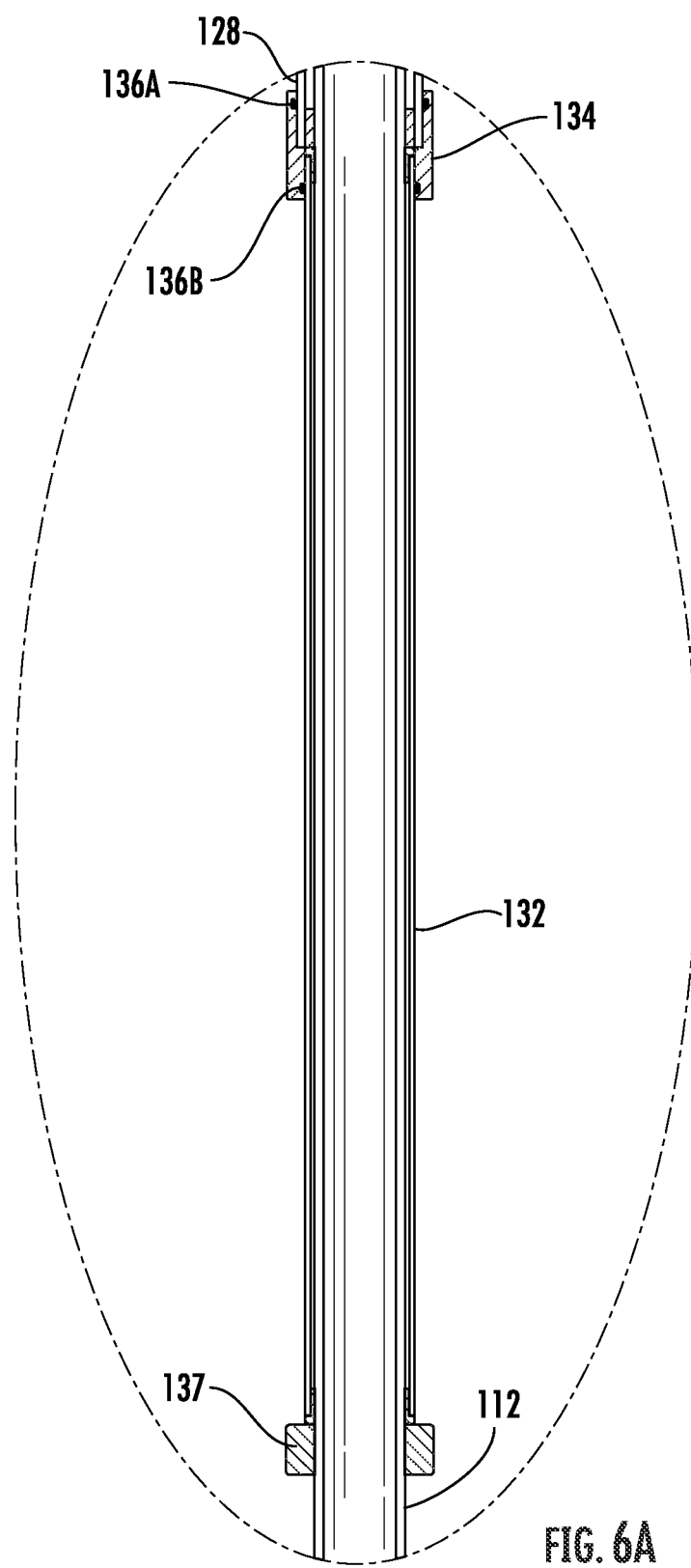
FIG. 6A shows a close-up view of a portion of the manually rotatable sonar transducer mounting apparatus taken at section "E" in FIG. 4 showing a tension collar in an engaged position.
Figure 6B:
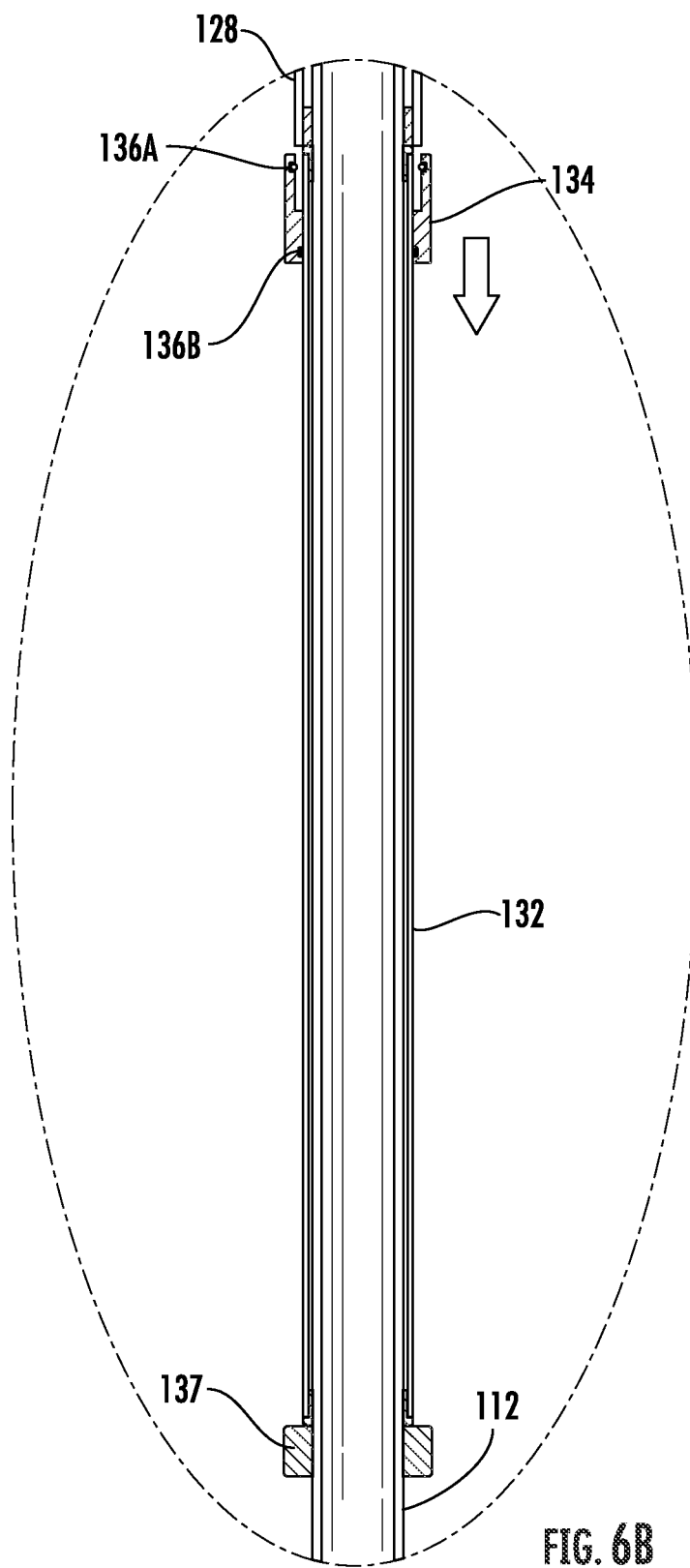
FIG. 6B shows a close-up view of a portion of the manually rotatable sonar transducer mounting apparatus taken at the same section as the one shown in FIG. 6A but showing the tension collar in a disengaged position.

The manually rotatable sonar transducer mounting apparatus 100 preferably further includes a mounting sleeve 132 that interfaces with or otherwise abuts against the bottom shaft sleeve first end 130A. The mounting sleeve 132 is the portion of the manually rotatable transducer mounting apparatus 100 that can be mounted to the side of a boat. The manually rotatable transducer mounting apparatus 100 can also be attached to a trolling motor on a boat. If the manually rotatable transducer mounting apparatus 100 is attached to a boat along the mounting sleeve 132, the mounting sleeve 132 remains in a fixed position relative to a boat whereas the bottom shaft sleeve 128 and the remainder of the manually rotatable transducer apparatus 100 is free to rotate relative to the mounting sleeve 132. However, it is undesirable for the remainder of the manually rotatable transducer apparatus 100 to rotate or otherwise twist too freely or the handle shaft 108 may accidentally rotate out away from a boat. As shown in FIG. 6A and FIG. 6B, to solve this potential problem, a tension collar 134 slidable along the mounting sleeve 132 can be partially slid over the bottom shaft sleeve first end 130A to create tension so that the remainder of the manually rotatable sonar transducer mounting apparatus 100 does not rotate too easily relative to the mounting sleeve 132 as shown as an "engaged position" in FIG. 6A. The tension collar 134 can be manually lowered below the bottom shaft sleeve first end 130A to a "disengaged position" as shown in FIG. 6B in which the remainder of the manually rotatable sonar transducer mounting apparatus 100 is free to rotate easily relative to the mounting sleeve 132. The tension collar 134 includes a first O-ring 136A and a second O-ring 136B to help cause friction if the manually rotatable transducer mounting apparatus 100 is rotated relative to the mounting sleeve 132 while the tension collar 134 is in the engaged position.

The mounting sleeve 132 is held in place and kept from falling off the bottom shaft 112 by a blocking collar 137 attached to and extending out from the bottom shaft 112 below the mounting sleeve 132. The blocking collar 137 is preferably fixed to the bottom shaft 112 and rotates with the bottom shaft 112.

The top shaft 108 preferably further includes a handle shaft 138 and a center shaft 140 connected linearly together such that the center shaft 140 rotates with the handle shaft 138. The center shaft 140 includes a center shaft first end 141A and a center shaft second end 141B. The first rotatable member 102 preferably further includes a third gear piece 116C connected to the top shaft 108 at or proximate to the top shaft second end 110B. The top shaft second end 110B preferably extends into an indentation 142 in a third wall 124C of the gear enclosure 118 wherein the third wall 124C is situated opposite the first wall 124A. The center shaft 140 preferably includes a concavity 143 to provide more space to run wiring or other electronic components related to a sonar transducer into the gear enclosure 118 and, for some components, down the center of the bottom shaft 112.

The manually rotatable sonar transducer mounting apparatus 100 preferably further includes a third rotatable member 144 including a fourth gear piece 116D, a direction indicator shaft 146 connected to the fourth gear piece 116D such that the direction indicator shaft 146 rotates with the fourth gear piece 116D, and a direction indicator cap 148 connected to the direction indicator shaft 146 such that the direction indicator cap 148 rotates with the direction indicator shaft 146 and the fourth gear piece 116D. The third gear piece 116C and the fourth gear piece 116D are preferably bevel gears although other gear types are contemplated such as, for example, cage and peg gears or other gear types known to persons having ordinary skill in the art. The third gear piece 116C is mechanically engaged with the fourth gear piece 116D inside the gear enclosure 118 so that when the first rotatable member 102 rotates, the third rotatable member 144 is caused to rotate. The direction indicator shaft 146 extends through a fourth wall aperture 125D in the fourth wall 124D of the gear enclosure 118 wherein the fourth wall 124D is preferably situated opposite the second wall 124B. The direction indicator cap 148 preferably includes an arrow 150 or other direction indicating symbol. When a sonar transducer is attached to the manually rotatable sonar transducer mounting apparatus 100, such transducer is preferably oriented so that it is pointing in the same direction as the arrow 150. When configured in this way, the arrow 150 will rotate with the sonar transducer and always indicate the direction of the sonar transducer. This is accomplished by a user rotating the handle 120 which imparts rotation motion to the first rotatable member 102 as a whole including the handle 120 and the third gear piece 116C, which, in turn, imparts rotation motion to the third rotatable member 144 including the fourth gear piece 116D and the direction indicator cap 148, thereby changing the direction of the arrow 150.

Figure 2:
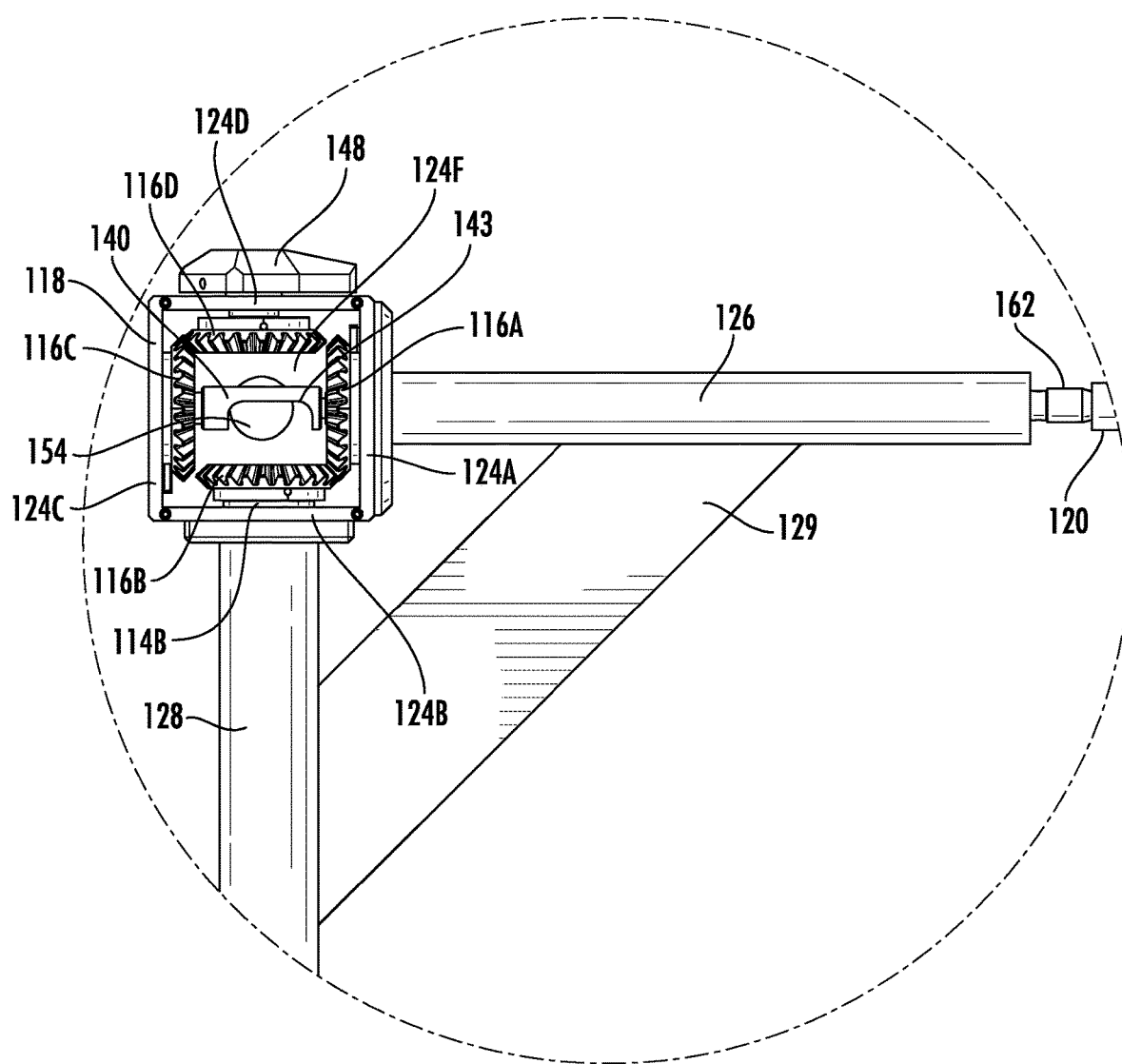
FIG. 2 shows a close-up view of a portion of the manually rotatable sonar transducer mounting apparatus taken at section "A" in FIG. 1.
Figure 3:
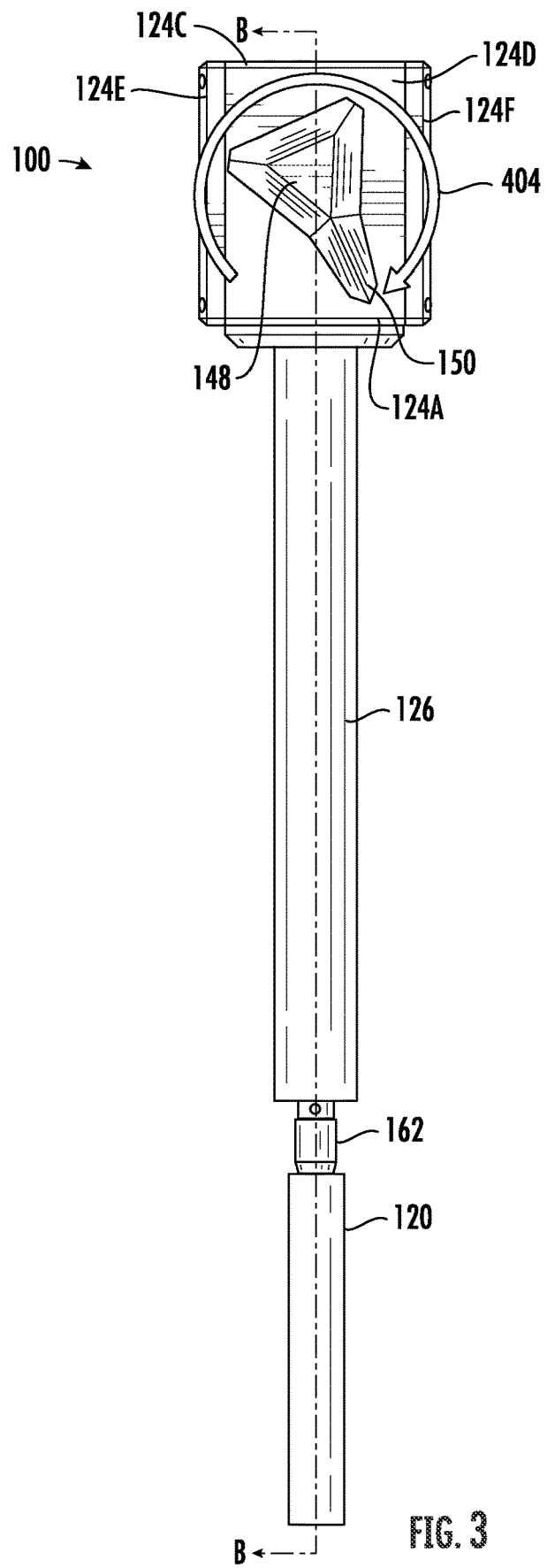
FIG. 3 shows a plan view of the manually rotatable sonar transducer mounting apparatus.
Figure 4:
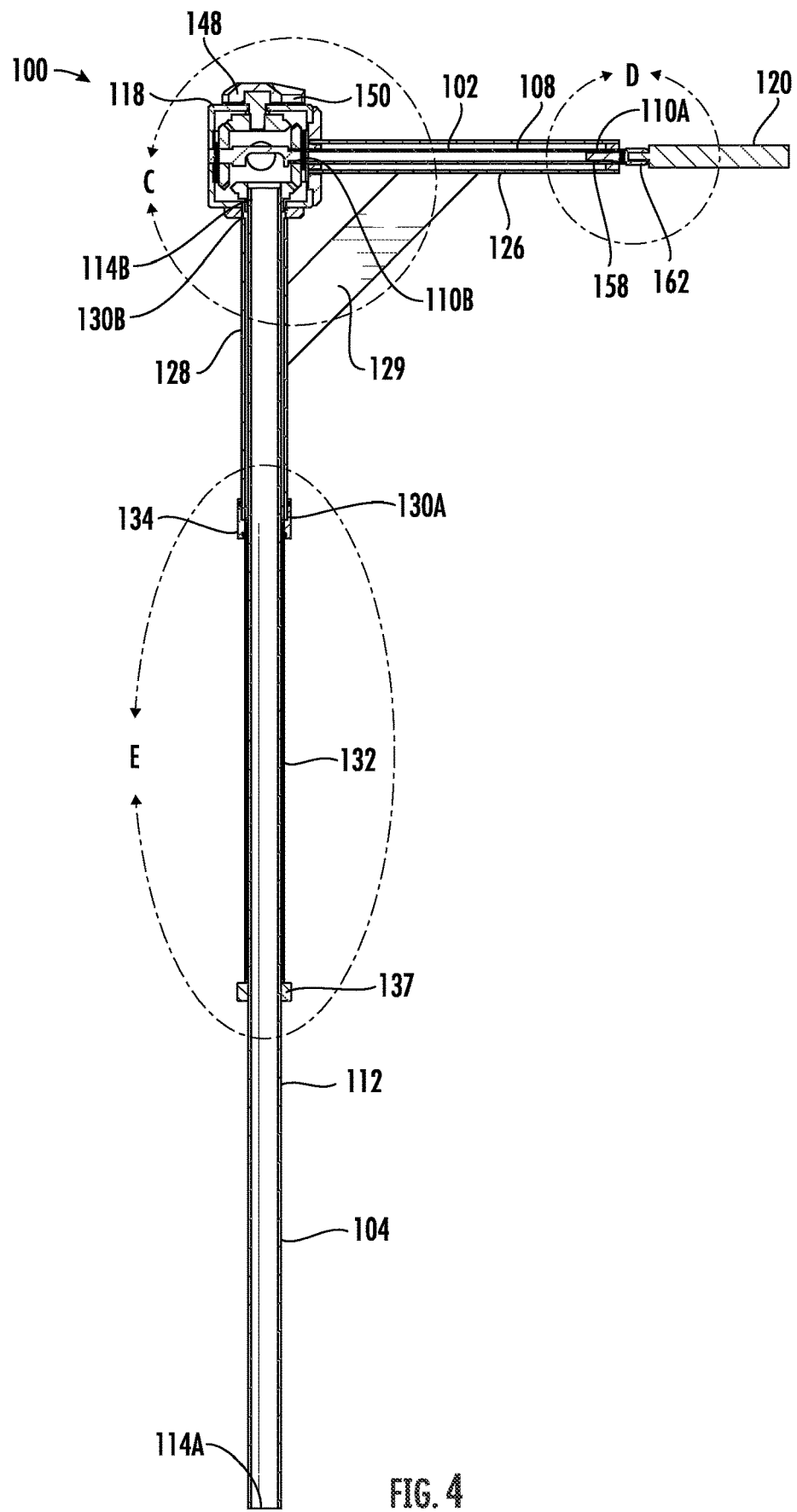
FIG. 4 shows a side cross-sectional view of the manually rotatable sonar transducer mounting apparatus cut along line B-B from FIG. 3.
Figure 5:
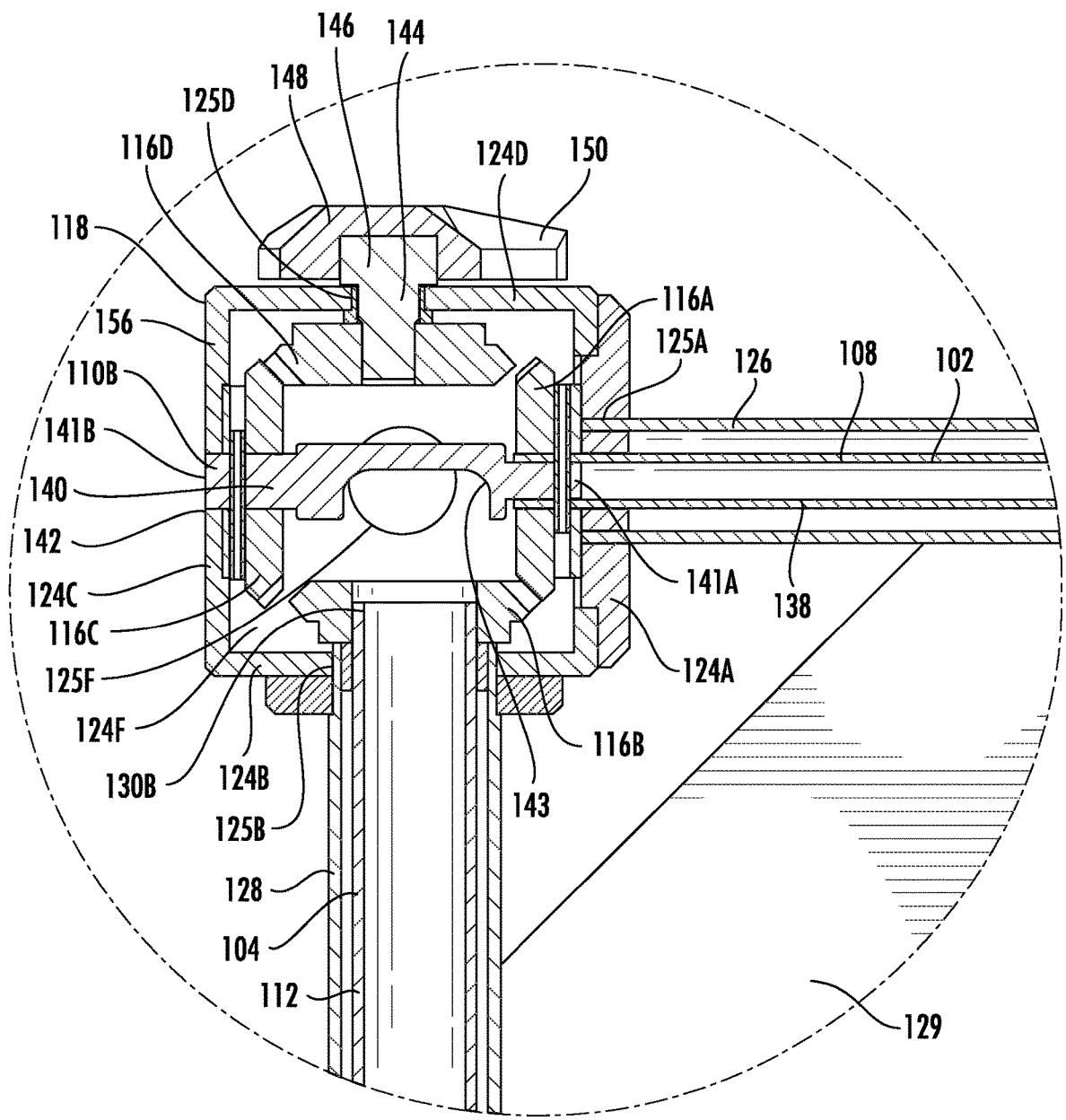
FIG. 5 shows a close-up view of a portion of the manually rotatable sonar transducer mounting apparatus taken at section "C" in FIG. 4.

The manually rotatable sonar transducer mounting apparatus 100 is used as a device for facilitating movement of a sonar transducer when a sonar transducer is submerged underwater and providing a mounting platform for a sonar transducer to be connected to a boat. A submersible transducer can be attached proximate to the bottom shaft first end 114A. Any wiring from the sonar transducer to a monitor or other user interface device can extend through a transducer mounting point aperture 122 proximate to the bottom shaft first end 114A and up through the hollow bottom shaft 112. Various sonar transducer devices and associated monitors or user interface devices are known in the art and there are many known ways to attach a sonar transducer to a pole to submerge a sonar transducer under water. Any wiring from a sonar transducer attached to the second rotatable member 104 can be run through the hollow interior of the bottom shaft 112 and extend out of the gear enclosure 118 to a monitor or user interface device on a boat. The gear enclosure 118 is preferably enclosed by a plurality of walls including the first wall 124A, the second wall 124B, the third wall 124C, the fourth wall 124D, a fifth wall 124E, and a sixth wall 124F which includes a sixth wall aperture 125F through which electrical wiring may extend into the gear enclosure 118 and down the bottom shaft 112 to a sonar transducer. In a preferred embodiment, the second wall 124B, the third wall 124C, and the fourth wall 124D form a single multi-wall structure 156 and the first wall 124A, the fifth wall 124E and the sixth wall 124F are each preferably separately attached to the multi-wall structure 156 preferably using screws, bolts, or other attachment means known to person having ordinary skill in the art. FIG. 3 shows the manually rotatable sonar transducer mounting apparatus 100 with the fifth wall 124E attached to the multi-wall structure 156 and FIG. 1 and FIG. 2 show views with the fifth wall 124E removed from the multi-wall structure 156.

Figure 7A:
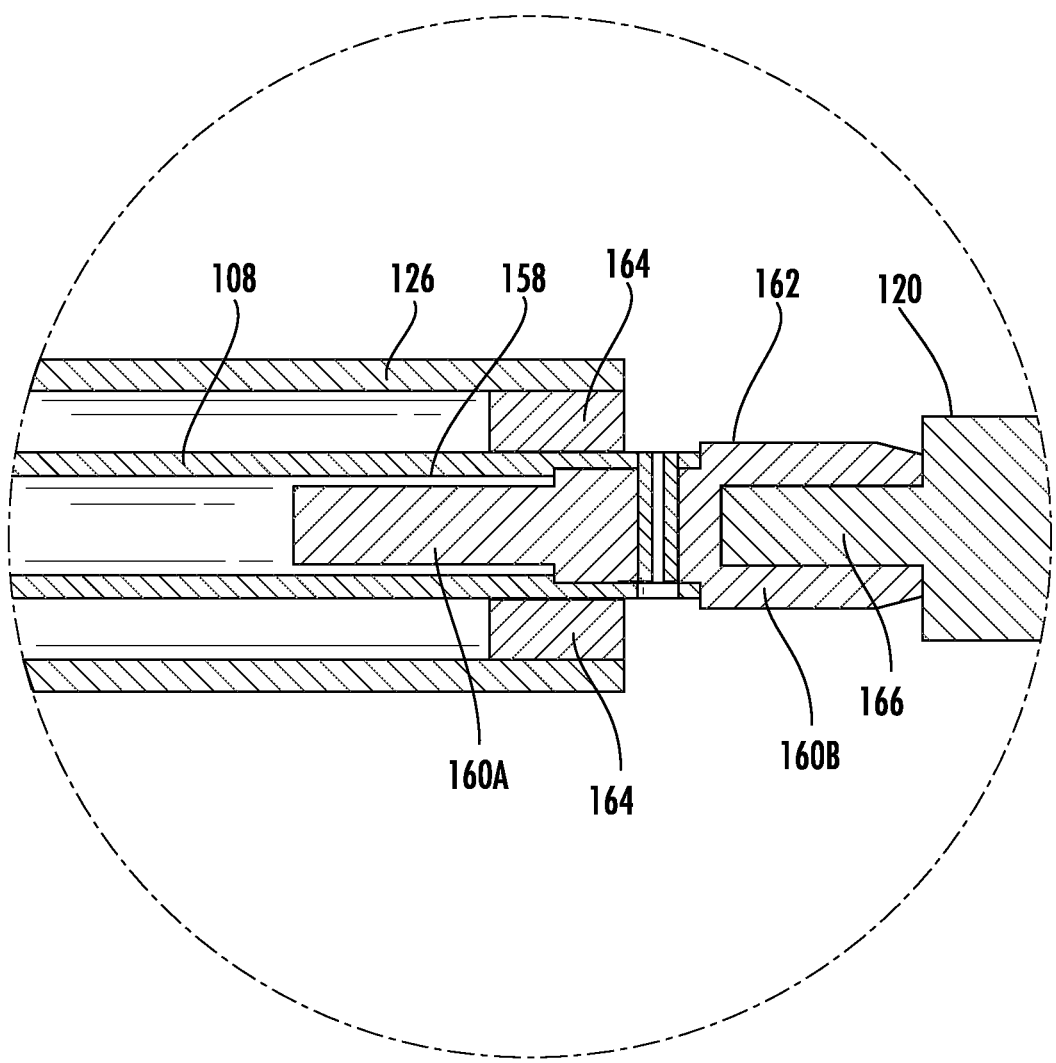
FIG. 7A shows a close-up view of the manually rotatable sonar transducer mounting apparatus taken at section "D" in FIG. 4.
Figure 7B:
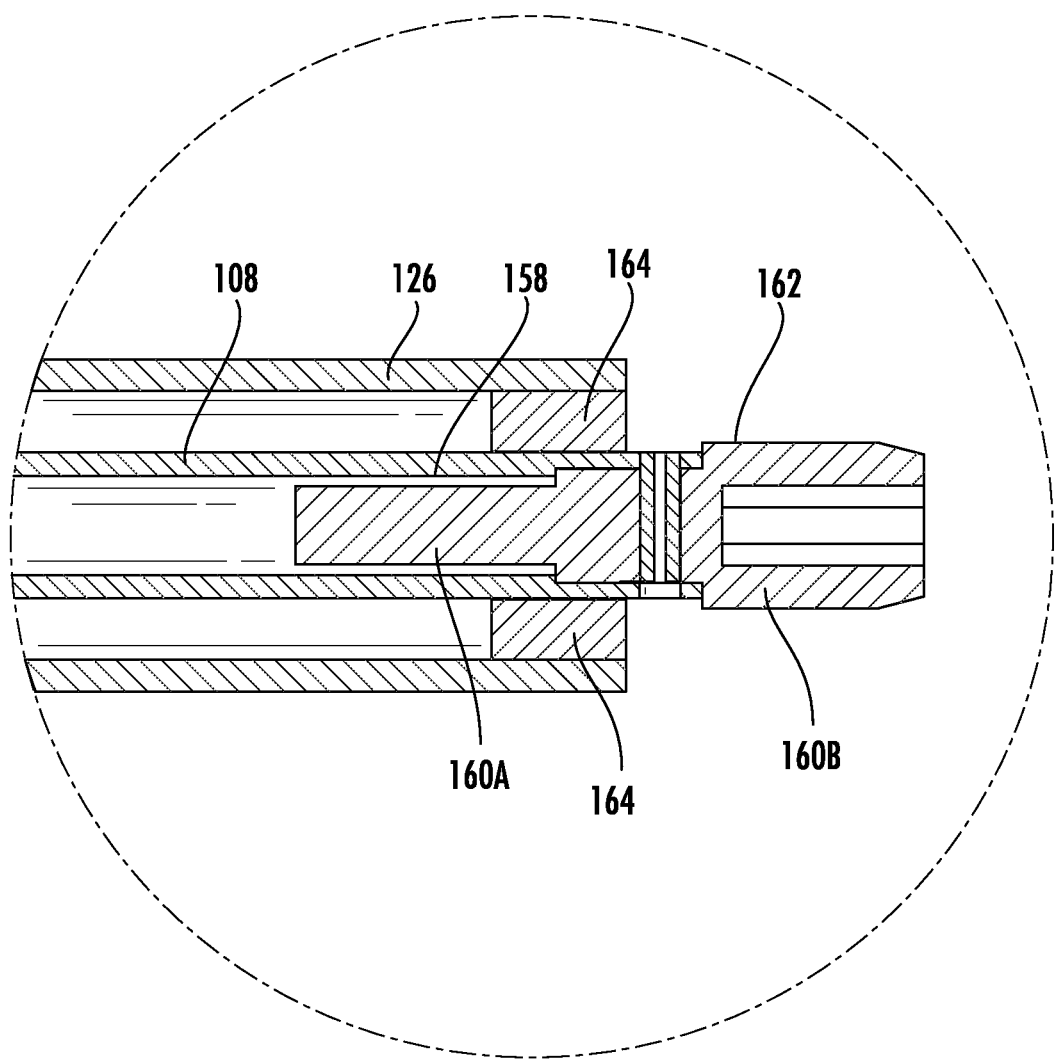
FIG. 7B shows a close-up view of a portion of the manually rotatable sonar transducer mounting apparatus taken at the same section as the one shown in FIG. 7A but showing the manually rotatable sonar transducer mounting apparatus without a handle.
Figure 7C:
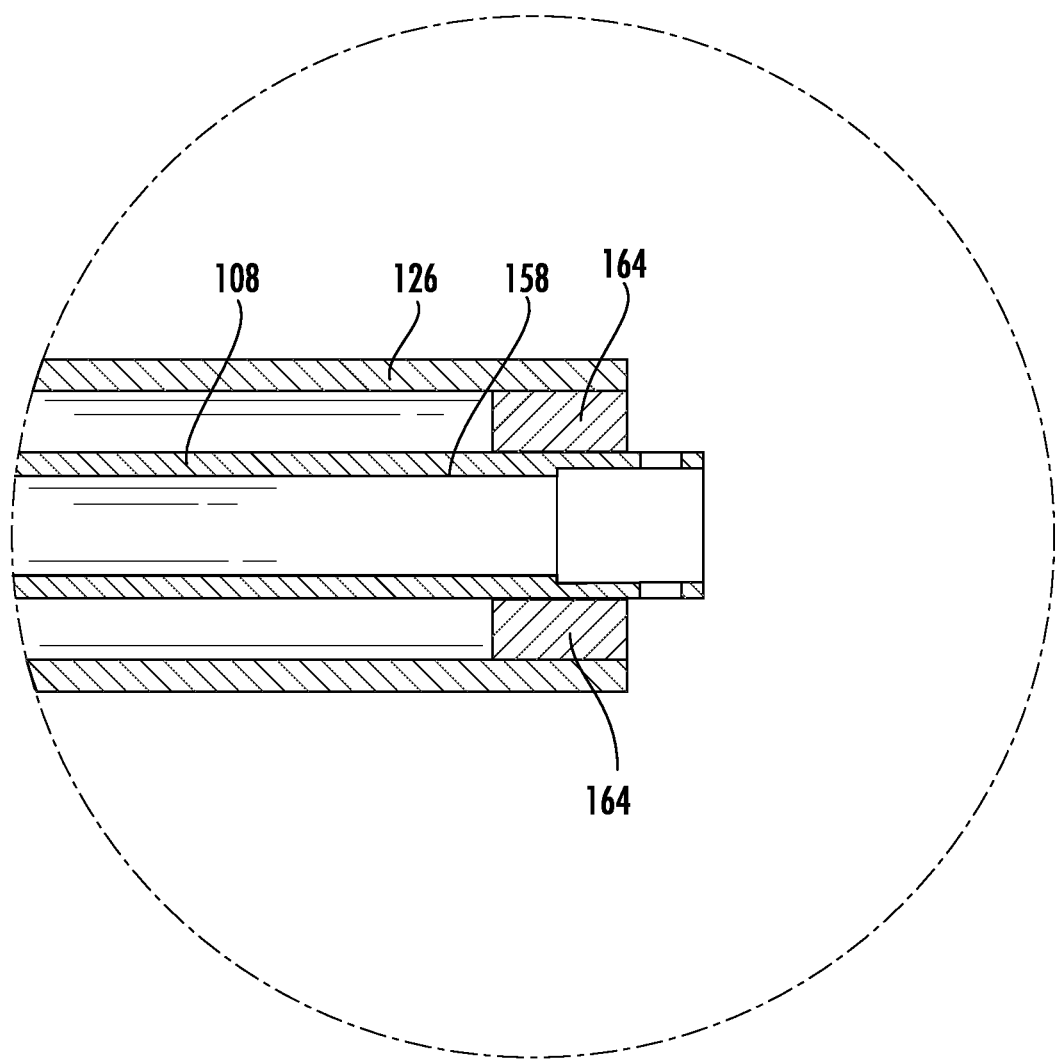
FIG. 7C shows a close-up view of a portion of the manually rotatable sonar transducer mounting apparatus taken at the same section as the one shown in FIG. 7B but showing the manually rotatable sonar transducer mounting apparatus without a coupler or a handle.
Figure 9:
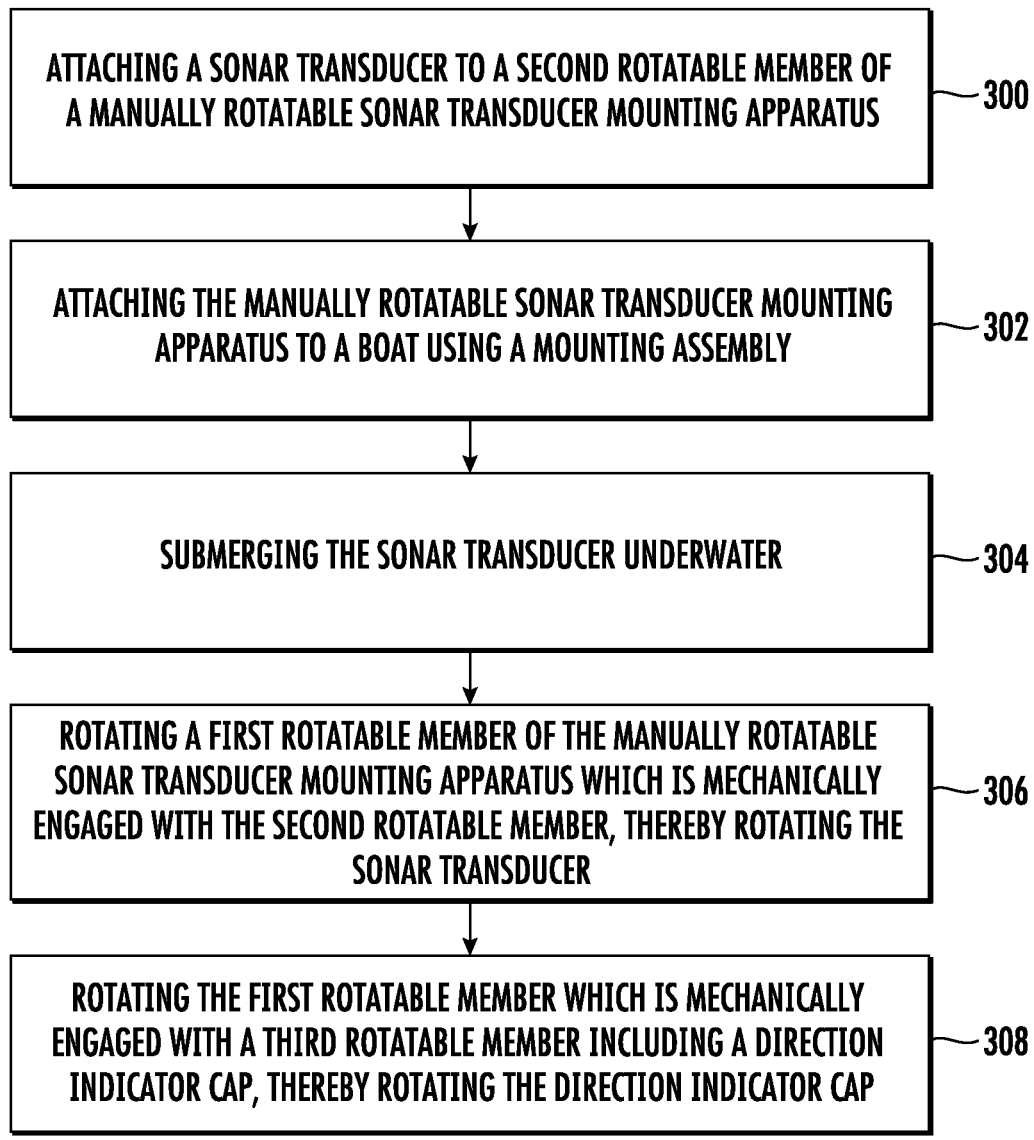
FIG. 9 shows a flow chart of method steps for operating the manually rotatable sonar transducer mounting apparatus described herein.

The top shaft 108 (which includes the handle shaft 138) preferably includes a socket 158 along the first end 110A of the top shaft 108 configured to be engaged with a male end 160A of a coupler 162 wherein the coupler also includes an opposed female end 160B. The socket 158 preferably includes a polygonal-shaped cross-section or other configuration which allows for torque to be imputed to the socket 158 by another device. The socket 158 is preferably flanked by handle sleeve bushings 164. Examples of couplers that can be used includes quick change screwdriver bit holders such as, for example, the ITBHQC201 2¼\" Impact Tough Quick Change Bit Holder available from Robert Bosch GmbH based in Gerlingen-Schillerhoehe, Germany. The female end 160B of the coupler 162 can be used to receive a rotational force from a male end of a manual or electric driving device including a device actuated by a pedal. Such rotational force is transferred through the coupler 162 to the first rotatable member 102 (including top shaft 108). The rotational motion is transferred from the first rotatable member 102 to the second rotatable member 104, thereby rotating any sonar transducer attached to the second rotatable member 104 along the bottom shaft 112. Preferable, the handle 120 is used for manual operation of the manually rotatable sonar transducer mounting apparatus, the handle 120 including a male extension 166 inserted into the female end 160B of the coupler 162 as shown in FIGS. 1-4 and FIG. 7A. FIG. 7B shows the coupler 162 engaged with the socket 158 with no other device attached to the coupler 162. FIG. 7C shows the first end 110A of the top shaft 108 including the socket 158 with no additional device attached to the socket 158. In one embodiment, the male extension 166 can be configured to fit within the socket and be inserted directly into the socket 158 without the use of a coupler.

A mounting assembly 168 shown in FIGS. 8A-8C can be used to attach the manually rotatable sonar transducer mounting apparatus 100 to a boat. The mounting assembly 168 includes a collar 170 including a first collar piece 172A hingedly attached to a second collar piece 172B along a hinge joint 174. The collar 170 preferably includes one or more apertures 176 for securing the first collar piece 172A to the second collar piece 172B using bolts, screws, of other attachment means. The second collar piece 172B includes or is otherwise attached to a flange extension 178 attached to a plate 180, wherein the plate 180 can be attached to a boat surface or other surface. The plate 180 preferably includes plate apertures 182 for attaching the mounting assembly 168 to a boat. The manually rotatable sonar transducer mounting apparatus 100 can be attached to a boat by first attaching the mounting assembly 168 to a boat along the plate 180. The mounting sleeve 132 of the manually rotatable sonar transducer mounting apparatus 100 is then preferably placed between the first collar piece 172A and the second collar piece 172B with the collar 170 in an open position opened along the hinge joint 174. The collar 170 can then be closed around the mounting sleeve 132 and the first collar piece 172A secured to the second collar piece 172B using one or more bolts.

The previously described embodiments of the present disclosure have many advantages, including providing an apparatus for manually rotating a submerged sonar transducer to search for animate objects (e.g., fish) and inanimate objects underwater. Because the apparatus is manually operated, very little noise is made when the first rotatable member 102 is being rotated. Prior art devices rely on battery-powered motors which create noticeable noise which can frighten fish away from a boat. The manually rotatable sonar transducer mounting apparatus 100 described herein overcomes that problem. Some devices known in the art include a handle oriented like the first rotatable member 102 but without the internal gear components for rotation of the rotatable member 102. Therefore, in those prior art devices the handles themselves must be moved causing a distal end of such handles to extend out and away from a boat. Embodiments of the manually rotatable sonar transducer mounting apparatus 100 described herein allow for the orientation of the first rotatable member 102 to remain stationary so that all that is needed to rotate an attached sonar transducer is for a user to grip the handle 120 on the first rotatable member 102 and rotate his or her wrist, thereby twisting the first rotatable member 102 as shown by arrow 400 and causing the second rotatable member 104 to move (shown as arrow 402) along with any sonar transducer attached thereto. In this way, a user can stay in the center of a boat while using the apparatus 100, thereby increasing safety. Moreover, a sonar transducer can be rotated greater than 360 degrees by a user simply rotating his or her wrist to rotate the handle. For embodiments including the third rotatable member 144, as mentioned above, the arrow 150 along the is preferably oriented in the direction where a sonar transducer attached near the bottom shaft first end 114A is pointing. When the first rotatable member 102 is twisted as shown by arrow "A", the direction indicator cap 148 rotates as shown by arrow 404. Such a configuration allows a user to know the direction in which the attached sonar transducer is pointing at any given moment by simply looking at the arrow 150 on the direction indicator cap 148. A related advantage is that a user using the apparatus 100 on a boat can be using the apparatus 100 and looking in a different direction than the direction in which the boat is moving.

In addition to the apparatus embodiments described herein, a method is disclosed for operating the manually rotatable sonar transducer mounting apparatus 100. The method includes attaching a sonar transducer 406 to the manually rotatable sonar transducer mounting apparatus 100 along the bottom shaft 112 of the second rotatable member 104 (Step 300). A next step includes attaching the manually rotatable sonar transducer mounting apparatus 100 to a boat using a mounting assembly 168 (Step 302). An additional step includes submerging the sonar transducer underwater (Step 304). Another step includes rotating the first rotatable member 102 which is connected to the second rotatable member 104 including the bottom shaft 112 as described herein, thereby rotating the attached transducer (Step 306). In a preferred embodiment, when the first rotatable member 102 is rotated, the third rotatable member 144 is caused to rotate, thereby rotating the direction indicator cap 148 to indicate the direction the transducer is facing underwater. The steps described above are preferably carried out without the use of a motor to reduce noise. In a simplified embodiment, the method for operating the manually rotatable sonar transducer mounting apparatus 100 includes rotating the first rotatable member 102 which is connected to the second rotatable member 104 including the bottom shaft 112 as described herein, thereby rotating the attached transducer.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

Any element in a claim that does not explicitly state "means for" performing a specified function, or "step for" performing a specific function, is not to be interpreted as a "means" or "step" clause as specified in 35 U.S.C. § 112, ¶6. In particular, the use of "step of" or "step for" in the claims herein is not intended to invoke the provisions of 35 U.S.C. § 112, ¶6.

What is claimed is:

1. A manually rotatable sonar transducer mounting apparatus comprising:
   a. a first rotatable member comprising:
      i. a top shaft comprising a top shaft first end and a top shaft second end; and
      ii. a first gear piece connected to the top shaft distal to the top shaft first end;
   b. a second rotatable member comprising:
      i. a bottom shaft comprising a bottom shaft first end, a bottom shaft second end, and a transducer mounting point aperture located proximate to the bottom shaft first end;
      ii. a second gear piece connected to the bottom shaft proximate to the bottom shaft second end, wherein the bottom shaft is hollow at least partially through the bottom shaft; and
   c. a gear enclosure comprising:
      i. a first wall;
      ii. a top shaft sleeve attached to the first wall, wherein the top shaft extends through the first wall and the top shaft sleeve, with the first gear piece located inside the gear enclosure;
      iii. a second wall oriented orthogonal to the first wall; and
      iv. a bottom shaft sleeve including a bottom shaft sleeve first end and a bottom shaft sleeve second end, the bottom shaft sleeve attached to the second wall, wherein the bottom shaft extends through the second wall and the bottom shaft sleeve, with the second gear piece located inside the gear enclosure mechanically engaged with the first gear piece.

2. The manually rotatable sonar transducer mounting apparatus of claim 1 further comprising a handle connected to the top shaft first end.

3. The manually rotatable sonar transducer mounting apparatus of claim 1 wherein the top shaft further comprises a handle shaft extending from the top shaft first end to a center shaft; and the center shaft comprising a center shaft first end and a center shaft second end, the center shaft connected to the handle shaft and configured such that the center shaft rotates when the handle shaft rotates.

4. The manually rotatable sonar transducer mounting apparatus of claim 3 wherein the first rotatable member further comprises a third gear piece connected to the center shaft proximate to the center shaft second end, and wherein the center shaft second end extends to an indentation in a third wall of the gear enclosure.

5. The manually rotatable sonar transducer mounting apparatus of claim 4 further comprising:
   d. a third rotatable member further comprising:
      i. a fourth gear piece mechanically engaged with the third gear piece;
      ii. a direction indicator shaft connected to the fourth gear piece and configured such that the direction indicator shaft rotates when the fourth gear piece rotates, and wherein the direction indicator shaft extends through a fourth wall of the gear enclosure; and
      iii. a direction indicator cap located outside the gear enclosure and connected to the direction indicator shaft configured such that the direction indicator cap rotates when the direction indicator shaft rotates.

6. The manually rotatable sonar transducer mounting apparatus of claim 1 further comprising:
   e. a mounting sleeve surrounding a partial lengthwise section of the bottom shaft wherein the bottom shaft is free to rotate inside of and relative to the mounting sleeve; and
   wherein the second rotatable member further comprises a blocking collar attached to the bottom shaft above the transducer mounting point aperture and below the mounting sleeve to hold the mounting sleeve on the bottom shaft.

7. The manually rotatable sonar transducer mounting apparatus of claim 6 further comprising:
   f. a tension collar configured to slide along the mounting sleeve and to at least partially overlap the bottom sleeve first end when the tension collar is in an engaged position, the tension collar comprising a plurality of interior O-rings wherein a first O-ring remains in contact with the mounting sleeve at all times and a second O-ring contacts the bottom shaft sleeve when the tension collar is in the engaged position, thereby creating tension between the mounting sleeve and the bottom shaft sleeve.

8. A method for operating a manually rotatable sonar transducer mounting apparatus without the use of a motor, the method comprising:
   providing a manually rotatable sonar transducer mounting apparatus comprising:
      a first rotatable member comprising:
         a top shaft comprising a top shaft first end and a top shaft second end; and
         a first gear piece connected to the top shaft distal to the top shaft first end;
      a second rotatable member comprising:
         a bottom shaft comprising a bottom shaft first end, a bottom shaft second end, and a transducer mounting point aperture located proximate to the bottom shaft first end;
         a second gear piece connected to the bottom shaft proximate to the bottom shaft second end, wherein the bottom shaft is hollow at least partially through the bottom shaft; and
      a gear enclosure comprising:
         a first wall;

a top shaft sleeve attached to the first wall, wherein the top shaft extends through the first wall and the top shaft sleeve, with the first gear piece located inside the gear enclosure;

a second wall oriented orthogonal to the first wall; and a bottom shaft sleeve including a bottom shaft sleeve first end and a bottom shaft sleeve second end, the bottom shaft sleeve attached to the second wall, wherein the bottom shaft extends through the second wall and the bottom shaft sleeve, with the second gear piece located inside the gear enclosure mechanically engaged with the first gear piece;

attaching a sonar transducer to a bottom shaft of the second rotatable member of the manually rotatable sonar transducer mounting apparatus to form an assembled sonar transducer control apparatus;

attaching the assembled sonar transducer control apparatus to a boat using a mounting assembly;

submerging the sonar transducer underwater;

rotating the first rotatable member which is mechanically engaged with and connected to the second rotatable member, thereby rotating the attached sonar transducer.

9. The method of claim 8 wherein the rotating step further comprises rotating the first rotatable member which is mechanically engaged with and connected to a third rotatable member, the third rotatable member including a direction indicator cap, wherein rotation of the first rotatable member causes rotation of the direction indicator cap, and wherein the direction indicator cap is oriented to face in the same direction as the sonar transducer at all times.

* * * * *